Aug. 16, 1938.     F. H. REICHEL ET AL     2,127,466
PROCESS AND APPARATUS FOR DRYING ARTICLES
Filed Nov. 11, 1935     2 Sheets-Sheet 1
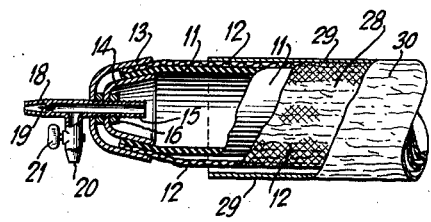
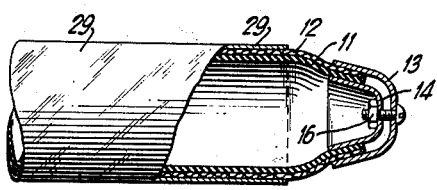
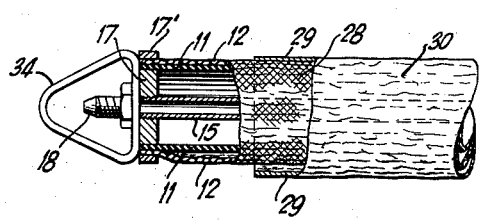
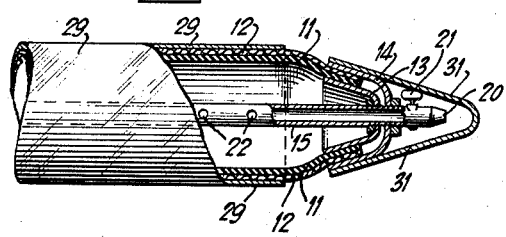
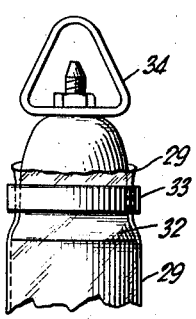
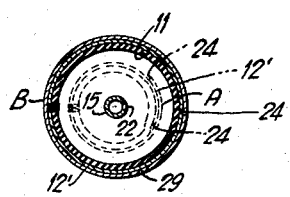
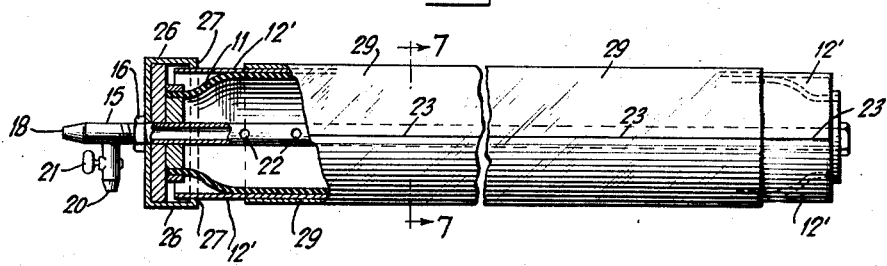
INVENTOR
FRANK H. REICHEL
AUGUSTUS EDWARD CRAVER
BY
Watson, Bristol, Johnson & Leavenworth
ATTORNEY Aug. 16, 1938.  F. H. REICHEL ET AL  2,127,466

PROCESS AND APPARATUS FOR DRYING ARTICLES

Filed Nov. 11, 1935  2 Sheets-Sheet 2

INVENTOR
FRANK H. REICHEL
AUGUSTUS EDWARD CRAVER
BY
Watson, Bristol, Johnson & Leavenworth
ATTORNEY Patented Aug. 16, 1938

2,127,466

UNITED STATES PATENT OFFICE 2,127,466

PROCESS AND APPARATUS FOR DRYING ARTICLES

Frank H. Reichel and Augustus Edward Craver, Fredericksburg, Va., assignors to Sylvania Industrial Corporation, Fredericksburg, Va., a corporation of Virginia Application November 11, 1935, Serial No. 49,263

6 Claims. (Cl. 34—16)

The invention relates in general to a process, and an apparatus for drying tubing. More particularly, it relates to a process and an apparatus for drying flexible tubing formed of a plastic material adapted for use as a casing, and includes correlated improvements and discoveries whereby the manufacture of such tubing may be enhanced.

It is an object of the invention to provide a process and an apparatus for drying a flexible tubing in a manner such that the dried tubing has a predetermined, definite and uniform diameter and is free of wrinkles and longitudinal creases.

Another object of the invention is the provision of an internal support for tubing during the drying thereof, the support being adapted for use with tubing of different diameters.

It is a further object of the invention to provide a process and an apparatus for continuous drying of seamless, flexible tubing adapted for use as a casing in accordance with which the tubing may be dried to a predetermined and substantially uniform content of solvent or swelling agent.

It is a specific object of the invention to provide a simple and economical process and apparatus for drying seamless flexible tubing adapted for use as a sausage casing so that longitudinal and/or transverse shrinkage which normally occurs during drying is controlled or prevented, and a casing which is free of wrinkles and creases and which is of substantially uniform length and diameter.

Other objects of the invention will in part be obvious and will in part appear hereinafter.

According to the invention, tubing formed of plastic material containing a solvent or swelling agent may be dried by disposing the tubing on the outside of a mandrel which is expansible and contractible transversely, expanding the mandrel to a predetermined diameter, drying the tubing while it is supported on the mandrel and thereafter contracting the mandrel sufficiently to remove the tubing therefrom.

The mandrel supporting the tubing during drying comprises a core which is expansible and contractible in a transverse direction and which is surrounded by a sheath, which may be expanded to a predetermined diameter and which may serve to limit the expansion of the core, and means for introducing an expansion medium into the core of the mandrel whereby it is expanded transversely to the desired diameter.

The invention accordingly comprises a process having the steps, and the relation of steps; and an apparatus having the elements and the relation of elements all as exemplified in the following detailed disclosure and the scope of the invention will be indicated in the claims.

For a more complete understanding of the nature and objects of the present invention, reference should be had to the accompanying drawings, in which:

Figure 1 is a fragmentary view, partly in section, of a mandrel for drying tubing in accordance with the invention;

Figure 2 is a view of another part of the mandrel of Figure 1 when expanded;

Figure 3 is a fragmentary view, partly in section, of another embodiment of the mandrel of Figure 1;

Figure 4 is a fragmentary view, partly in section, of a further embodiment of the mandrel of the invention;

Figure 5 is a view of a means for affixing the casing to the mandrel;

Figure 6 shows, partly in section, another embodiment of the mandrel;

Figure 7 is a sectional view of the mandrel of Figure 6 taken along the line 7—7;

Figure 8:
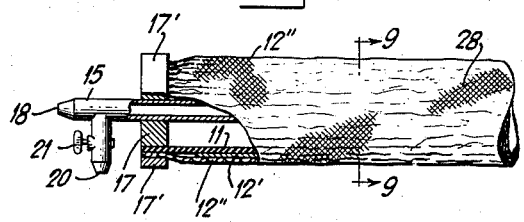
Figure 8 is a fragmentary view of a modification of the mandrel of Figure 6 before expansion.

The process and apparatus of the invention will be described in connection with the drying of an artificial casing, but it is to be understood that the process and apparatus are applicable for drying various types of flexible tubing, whether seamless or not. This tubing may be formed in whole or in part of a plastic material, especially non-fibrous cellulosic material such, for example, as cellulose hydrate; cellulose derivatives as the esters, ethers, and oxy-ethers; as well as from plastic materials, e. g. gelatine, casein, a rubber, a resin such as polymerized vinyl resin and the like.

Before the drying operation, the tubing is preferably conditioned to improve its flexibility. Thus, tubing formed of colloidal material swelling in water, such as cellulose hydrate, may be passed through an aqueous bath containing about 15 per cent glycerine, the surface liquid removed, and the tubing dried as described herein.

Figure 1 illustrates a simple embodiment of a drying mandrel in which the core 11 consists of an expansible and contractible tubing, formed of an elastic material such as rubber, which is surrounded by a tubular sheath 12 formed of a flexible material. The normal diameter of the core 11 is preferably less than that of the diameter desired in the finished dried tubing. The maximum diameter of the tubular sheath 12 is preferably that desired in the finished dried tubing and is greater than the normal diameter of the core 11.

The core 11 and preferably also the sheath 12 are anchored at each end and the ends closed by suitable means such as concentric cups 13 and 14 having a pipe 15 passing through those at one end. The cups are held in gripping position by the nuts 16, as shown in Figures 1 and 2. Alternatively, as shown in Figure 3, the ends of the core and sheath may be closed by means of concentric bands 17 and 17' which grip the ends therebetween and which are positioned upon the pipe 15. The pipe 15 serves as a means for introducing a fluid or expansion medium into the interior of the mandrel for expanding the core 11, and this pipe may be provided with a tapered nozzle 18 and a suitable air valve 19 such as a Sharples valve. The assembly is provided also with a fluid outlet 20 having a valve 21.

The mandrel shown in Figures 1 and 2 is relatively flexible and uneven drying of the plastic tubing on the mandrel may produce a slight curvature thereof. To avoid this, the mandrel may be made rigid. For example, as shown in Figures 3 and 4 it may be stiffened by having the pipe 15 extend the full length of the mandrel. In this case the pipe 15 is provided with a plurality of spaced openings 22 through which expanding fluid is admitted into the interior of the core 11. The fluid may be admitted through one end of the pipe 15 and vented through the opposite end which is provided with a valve 21.

The tubular sheath may be formed of any suitable flexible material such as a textile fabric, preferably one having a fine mesh or weave and sewed together to form a cylindrical tubing having a longitudinal seam. If such seam is objectionable, the sheath may be formed by weaving a suitable textile material into a seamless tubing. This sheath may be integral with the core or separate and demountable therefrom. For example, it may be formed of an elastic textile material expansible in a transverse direction to a predetermined diameter, and which is affixed to the core by a suitable adhesive over part or all of their contiguous surfaces. When the sheath is separable from the core it may be removed and replaced by another sheath of different diameter and the same core used, within certain limits, for drying plastic tubings of different diameters, or for producing dried tubings of different diameters from a single batch of tubing of a given diameter.

Instead of forming the sheath 12 of a textile fabric, it may be formed of a thin sheet of a suitable metal. Referring to Figure 6, the drying mandrel comprises a core of an expansible and contractible tubing 11 which is adapted to be expanded against an outer resilient tubular sheath 12' formed of a sheet metal which has been shaped into a substantially cylindrical member having unsealed longitudinal edges 23. The edges 23 overlap to a considerable extent in the initial or unexpanded position, as shown in broken lines at A in Figure 7. These edges 23 are provided with flanges 24 which are adapted to engage each other in locking position when the sheath 12' has been expanded to its maximum diameter which is marked B in Figure 7.

Figure 9:
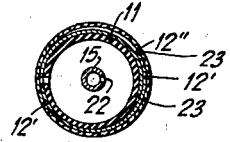
Figure 9 is a sectional view along the line 9—9 of the mandrel of Figure 8 showing the relation of elements.

Other means may be provided for limiting the expansion of the resilient metal sheath. A suitable means is shown in Figure 6 in which the mandrel is provided at one end with a metal cap 26 having a flange 27 which encloses the end of the sheath 12' and limits its expansion. In another embodiment of the mandrel shown in Figures 8 and 9, the core is provided with a resilient metal sheath 12', as in the mandrel of Figure 6, which is enclosed in a second sheath 12'' consisting of a tubing formed of textile material and having a predetermined diameter. Before expansion the textile sheath 12'' fits loosely about the metal sheath 12', as revealed by the wrinkles 28 shown in Figure 8. When the core 11 and the metal sheath 12' are expanded, the textile sheath 12'' serves to limit the expansion and give the mandrel a predetermined final diameter, as shown in Figure 9. If the edges of the metal sheet of the resilient sheath 12' are caused to overlap sufficiently in its initial unexpanded state, it is obvious that the textile sheath 12'' may be replaced by another of like character but of different diameter and thus afford means for producing, with the same core, dried plastic tubings of several different diameters.

The plastic tubing 29, such as an artificial sausage casing formed of cellulose hydrate, which is to be dried, is slipped over the mandrel when the mandrel is in its contracted condition, as shown in Figure 1. Air is then admitted through the pipe 15 and the expansible core 11 inflated until the limiting sheath 12 is expanded to the desired extent, which may be to an extent which will just remove the wrinkles 30 from the plastic tubing 29, or to an extent which will stretch the plastic tubing 29 to a predetermined diameter. The inflated mandrel carrying the tubing 29 has the relationship shown in Figures 2 and 4.

When the plastic tubing 29 has been dried to the desired degree, the air within the mandrel is vented through the tube 20 by turning the valve 21, whereupon the expansible core 11 contracts thus permitting the sheath 12 to collapse. As the diameter of the mandrel is now less than that of the dried tubing, the latter may be easily slipped from the mandrel.

When the end of the mandrel is of such shape that it might rupture the tubing being slipped thereover, a removable cap 31 of suitable shape and material may be provided to cover the end of the mandrel, as shown in Figure 4.

In some cases, it may be desirable to prevent any longitudinal shortening of the plastic tubing during drying. To this end, a mandrel, such as that shown in Figure 1, may be provided with a head which is shaped to flare at the lower edge 32, as shown in Figure 5, and there is provided a concentric ring 33 which may be disposed to grip the tubing 29 between it and the flared edge 32. Both ends of the plastic tubing may be anchored in this manner, if desired.

The mandrel of the invention may be suspended in any suitable manner, for example, by providing one end with a supporting member 34 as shown in Figures 3 and 5. Both ends of the mandrel may be provided with such members so that the mandrel may be disposed in a drying atmosphere either in a horizontal or vertical position. There is shown in Figures 10 and 11 one embodiment of a drying apparatus for carrying out the process of the invention which comprises a drying chamber having means to heat the same, means, preferably a conveyor moving in an endless path, for carrying the mandrels and preferably another chamber provided with means for conditioning the atmosphere with respect to humidity.

Figure 10:
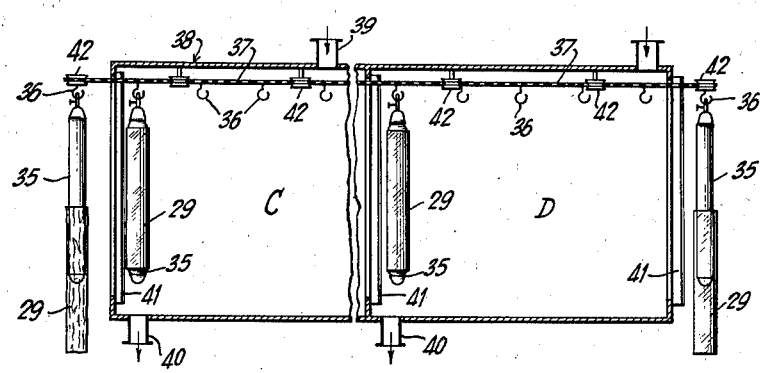
Figure 10 depicts, in a side elevation, partly in section, an apparatus adapted for drying tubing supported upon the mandrels.

Referring to Figure 10, an expanded mandrel 35 carrying an artificial sausage casing 29 is suspended on a hook 36 carried on an endless conveyor such as a chain 37 through a drying chamber 38 having entrance and exit ports 39 and 40 for passing heated air through the chamber, and entrance and exit flaps 41 for preventing the escape of the heated air. As shown in Figure 11, the endless chain traverses a closed path in a horizontal plane, although it is understood that means could be provided for passing the conveyor in a closed circuit disposed in a vertical plane. The conveying chain 37 is supported by rotatable members 42 having suitable flanges thereon (not shown) which engage and support the chain. In Figure 10, the mandrel at the extreme left is shown at the time the tubing 29 is being disposed thereon while the mandrel 35 at the extreme right, or the dry end of the chamber, is shown at a time during the stripping of the casing 29 from the mandrel 35.

Figure 11:
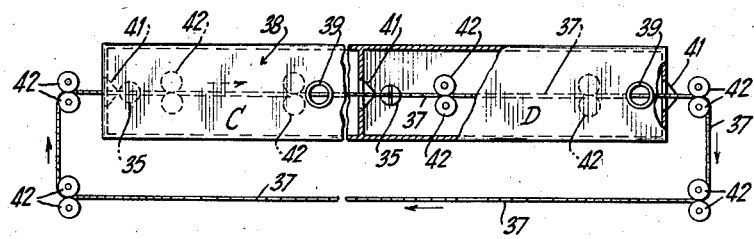
Figure 11 is a top plan view, partly in section, of the apparatus shown in Figure 10.

With tubing formed of a hydrophilic colloid, for example, regenerated cellulose, gelatine, casein, alkali-soluble cellulose ethers and the like, the treatment is preferably divided in at least two stages designated C and D in Figures 10 and 11. In stage C, the tubing may be dried by dry air having a temperature of 125° to 140° F., the traverse being sufficient to evaporate more than the amount of moisture desired in the finished tubing. In stage D, the tubing is contacted with air heated to a temperature of 125° to 140° F. but having a relative humidity of 60 per cent. The humidity may be controlled by introducing moisture in the air stream. By this two stage process, it is possible to dry the tubing to an excessive degree in a short time in stage C and then to reimpart sufficient moisture in stage D to produce a tubing having the requisite flexibility and tensile strength. With a wet sausage casing formed of regenerated cellulose, the moisture content at the entrance to stage C is about 35 per cent by weight, while the moisture content of the dried casing at the exit of stage D is about 8 per cent by weight.

The process and apparatus of the invention have, among others, the following advantages: The tubing may be dried to a predetermined, definite and uniform diameter and rendered free of wrinkles and longitudinal creases; within certain limits, tubing of different diameters may be dried on the same mandrel, thus effecting a saving in equipment; within certain limits, a given mandrel may be used for producing dried tubings of different diameters from a single batch of tubing of a given diameter; by anchoring the ends of the tubing to the mandrel, shortening of the tubing is prevented, thus increasing the output of the plant. Normally, a tubing formed of regenerated cellulose shrinks about 20 per cent longitudinally during drying; by stretching the tubing transversely and drying it in a stretched condition, there is obtained an enlarged diameter thus increasing the production; pre-stretching the tubing before drying decreases to some extent the stretch which occurs during stuffing in the manufacture of sausages; since the tubing is disposed on the outside of the mandrel, the tubing may be dried uniformly from end to end.

Since certain changes in carrying out the above process and apparatus and certain modifications in the article which embodies the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. In the claims, the term "solution" as used with reference to the tube-forming material is intended to include both true solutions thereof as well as colloidal solutions of mixtures in which the material is substantially uniformly dispersed.

We claim:

1. A mandrel comprising, in combination, a core expansible and contractible transversely, a sheath surrounding said core comprising a sheet of metal formed into a resilient tubular body having its longitudinal edges overlapping, means for retaining said sheath in position relative to said core, and means for transversely expanding the core against said sheath.

2. An expansible mandrel comprising, in combination, a cylindrical member formed of a sheet of resilient metal having its longitudinal edges overlapping, means disposed within said cylindrical member for transversely expanding said member, and means for limiting the transverse expansion of said member.

3. An expansible mandrel adapted to serve as a support for the drying of tubing formed of plastic material containing a solvent or swelling agent, said mandrel comprising, in combination, a core expansible and contractible transversely, a sheath surrounding said core and adapted to be transversely expanded to a predetermined diameter, means whereby expansion and contraction of the core and the sheath may be effected, and means for fastening the ends of the tubing to the mandrel to prevent substantial longitudinal shortening of the plastic tubing during drying.

4. In a process for drying tubing formed of plastic material containing a solvent or swelling agent, the steps comprising disposing the tubing on an expansible and contractible mandrel having a substantially continuous cylindrical surface, transversely expanding said mandrel to a predetermined diameter, evaporating solvent or swelling agent from the tubing while it is supported on the mandrel, and contracting the mandrel and stripping the tubing therefrom.

5. In a process for drying tubing formed of plastic material containing a solvent or swelling agent, the steps comprising disposing the tubing on a substantially cylindrical expansible and contractible mandrel, transversely expanding said mandrel uniformly against substantially the entire internal area of said tubing, maintaining the tubing thus supported while contacting the tubing first with a dry atmosphere and then with an atmosphere containing a solvent or swelling agent for said tubing material to reimpart solvent or swelling agent thereto in a predetermined amount, and thereafter contracting the mandrel and stripping the tubing therefrom.

6. An apparatus for treating artificial tubing and the like, comprising successively arranged treating chambers, an endless conveyor extending into said treating chambers, and a substantially cylindrical tubing-supporting mandrel connected to said conveyor, said mandrel comprising an expansible inner element, a sheath surrounding said element, and means carried by said element for connecting said mandrel to said conveyor.

FRANK H. REICHEL.
AUGUSTUS EDWARD CRAVER.